(12) United States Patent
Yada et al.

(10) Patent No.: US 8,758,875 B2
(45) Date of Patent: Jun. 24, 2014

(54) FORMABLE LAID INTERIOR DECORATION MATERIAL FOR AUTOMOBILE

(75) Inventors: Yasuhiro Yada, Aichi (JP); Masahito Imamura, Aichi (JP)

(73) Assignee: Hayashi Engineering Inc. (JP)

( * ) Notice: Subject to any disclaimer, the term of this patent is extended or adjusted under 35 U.S.C. 154(b) by 1311 days.

(21) Appl. No.: 12/097,740

(22) PCT Filed: Nov. 14, 2006

(86) PCT No.: PCT/JP2006/322600
§ 371 (c)(1),
(2), (4) Date: Jun. 16, 2008

(87) PCT Pub. No.: WO2007/069418
PCT Pub. Date: Jun. 21, 2007

(65) Prior Publication Data
US 2009/0176055 A1 Jul. 9, 2009

(30) Foreign Application Priority Data
Dec. 15, 2005 (JP) .................................. 2005-361901

(51) Int. Cl.
*B32B 3/10* (2006.01)
*B60R 21/04* (2006.01)

(52) U.S. Cl.
USPC .............. 428/138; 428/31; 428/131; 428/137

(58) Field of Classification Search
USPC .................... 428/95, 131, 138, 174, 31, 137; 442/268, 319, 326, 381, 394
See application file for complete search history.

(56) References Cited

U.S. PATENT DOCUMENTS

| | | | |
|---|---|---|---|
| 2003/0152742 A1* | 8/2003 | Shimizu et al. | 428/95 |
| 2006/0240732 A1* | 10/2006 | Araga et al. | 442/326 |
| 2007/0202302 A1* | 8/2007 | Matsuura et al. | 428/174 |

FOREIGN PATENT DOCUMENTS

| | | |
|---|---|---|
| JP | 3-233 | 1/1991 |
| JP | 4-72036 | 6/1992 |
| JP | 10-181468 A | 7/1998 |
| JP | 10-236204 A | 9/1998 |
| JP | 2000-160818 A | 6/2000 |
| JP | 2000-516175 | 12/2000 |
| JP | 2005-1403 A | 1/2005 |
| JP | 2005-297703 A | 10/2005 |

OTHER PUBLICATIONS

English translation of JP 2005-001403; Imamura, Masahito; Jun. 1, 2005.*
English translation of JP 2005-297703; Matsuura et al.; Oct. 27, 2005.*

(Continued)

*Primary Examiner* — Catherine A Simone
(74) *Attorney, Agent, or Firm* — Cantor Colburn LLP

(57) ABSTRACT

A formable laid interior decoration material (10) for an automobile is formed by laminating air-permeable design layer (11), apertured resin layer (12) having formed a plurality of apertures (12a) penetrating it in a thickness direction, shape-retaining felt layer (13) containing melted fibers, non-air-permeable resin sheet layer (14), and padding material (15), in this order. Formable laid interior decoration material (10) for an automobile is formed in a shape that conforms to a shape at a location where the material is laid in the automobile. The laminated body of air-permeable design layer (11), apertured resin layer (12), and shape-retaining felt layer (13) preferably has an air permeability of 1 to 30 $cc/cm^2$/second.

3 Claims, 3 Drawing Sheets

(56) References Cited

OTHER PUBLICATIONS

Japanese Office Action for Japanese Application No. 2005-361901 mailed Jan. 7, 2009 with English explanation.

International Search Report for International Application No. PCT/JP2006/322600 mailed Feb. 20, 2007.

The extended European Search Report for European application No. 06832562.0 mailing date of Mar. 1, 2012.

\* cited by examiner

FORMABLE LAID INTERIOR DECORATION MATERIAL FOR AUTOMOBILE

CROSS REFERENCE TO RELATED APPLICATIONS

This is a U.S. national stage of application No. PCT/JP2006/322600, filed on 14 Nov. 2006. Priority under 35 U.S.C. §119(a) and 35 U.S.C. §365(b) is claimed from Japanese Application No. 2005-361901, filed 15 Dec. 2005, the disclosure of which is also incorporated herein by reference.

TECHNICAL FIELD

The present invention relates to a formable laid interior decoration material for an automobile for decorating the interiors of automobiles.

BACKGROUND ART

Conventionally, various interior decoration materials are laid on the sheet steel panels in the interiors of automobiles to improve the design quality and tactile impression.

While the function of the laid interior decoration materials is to cover the sheet steel panels in the interiors of automobiles to mainly improve the design quality as mentioned above, the interior decoration materials for an automobile are often required to function as a soundproof material which absorbs or blocks various noises generated as the automobile travels (such as road noise, engine noise, and wind noise). In particular, road noise and engine noise tend to intrude from the direction of the floor of the automobile. For this reason, various structures of laid interior decoration materials are proposed which are laid on the area from the floor panel to the peripheral walls to function to improve the sound absorption and sound insulation.

As a typical example, Published Japanese translation of PCT international publication No. 2000-516175 discloses a simple laminated body which is configured by laminating air-permeable materials and which has its sound absorption and sound insulation improved by controlling the total resistance of a particular layer among the laminated layers to flow of air. In this example, in order to provide a light weight sound insulating kit, heavy layers having a weight per unit area of 4.0 kg/m$^2$ or more are eliminated from the constituent layers of the laminated body. A laminated body of an embodiment of the above document is formed by laminating air-permeable layers of weight per unit area of less than 2.67 kg/m$^2$. In addition, Japanese Patent Application Laid-Open No. 2005-297703 discloses a technique of securing air-permeability of a laminated body by laminating layers made of air-permeable materials through a bonding layer in which apertures are formed.

However, the inventors of the present application conducted a test in real vehicles by laying interior decoration materials corresponding to the conventional example described in Published Japanese translation of PCT international publication No. 2000-516175 in the passenger chambers of a plurality of vehicles to find that there are times when quietness in the passenger chambers could not be optimumly secured. Particularly in cases where the vehicle was a diesel engine vehicle, often much engine noise intruded from the panels surrounding the passenger chamber (such as the floor panel) into the passenger chamber so that the passenger chamber could not be optimumly quiet.

Generally, sound absorption is evaluated according to the sound absorbing rate $\alpha=1-(Ir/Ii)$ wherein Ii is the intensity of sound incident to the material and Ir is the intensity of the reflected sound. In order to improve sound absorbing characteristics of a sound absorbing material, it is important to make voids in the material communicate with each other; whereby sound waves can be absorbed in the deep interior to attenuate the vibration energy of the sound. As a typical value which is a criterion for the degree of this communication of voids, the air-permeability rate (the reciprocal of the value of resistance to flow) is often used.

On the other hand, sound insulation is the characteristic to reduce the transmission of sound waves by blocking or reflecting incident sound, and is evaluated according to the transmission rate $\tau=(It/Ir)$ wherein Ii is the intensity of sound incident to the sound insulating material, Ir is the intensity of the reflected sound, and It is the intensity of the transmitted sound transmitted through the sound insulating material, and more practically is evaluated according to the transmission loss $TL=10 \log 10(1/\tau)$. A heavy material having no voids is suitable for a sound insulating material in order to reduce transmitted sound, and therefore a material having the high density tissue is suitable for a sound insulating material.

In view of the above description, it is considered that in the case of an interior decoration material composed of only air-permeable materials, sound absorption can be secured but sound insulation is not sufficient since noise from outside the vehicle cannot be sufficiently blocked.

In addition, the interior decoration material of the conventional example described in Published Japanese translation of PCT international publication No. 2000-516175 has little formability. That is, it is difficult to form the interior decoration material of the conventional example into complex shape that adapts to the shapes at the locations where the material is laid in the interior of an automobile. In addition, the material has poor shape retention after being formed since it does not have a layer for retaining the formed shape.

DISCLOSURE OF THE INVENTION

In view of the above-described problems, the object of the present invention is to provide a formable laid interior decoration material for an automobile which is light in weight while having both excellent sound absorption and sound insulation properties, and which can be formed in desired shapes whose forms can be retained.

To achieve this object, the formable laid interior decoration material for an automobile of the present invention is formed by laminating an air-permeable design layer, an apertured resin layer, a shape-retaining felt layer, a non-air-permeable resin sheet layer, and a padding material, in this order. The apertured resin layer has formed a plurality of apertures that penetrate it in the thickness direction. The shape-retaining felt layer has part of its constituent fibers which is melted when the formable laid interior decoration material for an automobile is formed, thereby functioning to enable forming of the formable laid interior decoration material for an automobile in desired shapes as well as to enable retention of the formed shape. The formable laid interior decoration material for an automobile is formed in a shape that conforms to the shape at the location where it is laid in the automobile, based on the formability imparted by the shape-retaining felt layer, apertured resin layer, and non-air-permeable resin sheet layer.

In this configuration, above the non-air-permeable resin sheet layer, the air-permeable design layer/apertured resin layer/shape-retaining felt layer greatly contribute mainly to the sound absorption of the formable laid interior decoration material for an automobile. On the other hand, below the non-air-permeable resin sheet layer, the non-air-permeable resin sheet layer/padding material greatly contribute to the sound insulation. By combining these layers, a formable laid interior decoration material for an automobile that features both excellent sound absorption and sound insulation can be provided. The formable laid interior decoration material for an automobile thus configured to have improved sound absorption and sound insulation, when applied to a vehicle such as a diesel engine vehicle in which much engine noise intrudes from the floor panel, can optimumly improve quietness in the passenger chamber. The mechanism providing sound absorption, sound insulation, formability, and shape retention will be described below.

(Sound Absorption)

Sound absorption is obtained mainly by: sound waves being absorbed in the shape-retaining felt layer through the apertures of the apertured resin layer from the direction of the air-permeable design layer; and sound waves being absorbed in the shape-retaining felt layer by the apertured resin layer itself vibrating by means of the sound waves (the apertured resin layer is ultra-light as compared with a related art described in Published Japanese translation of PCT international publication No. 504528/93, or the like). In this way, sound waves that are absorbed in minute voids that are formed between fibers of the shape-retaining felt layer are attenuated by friction of the fibers, that is, energy of the sound waves is absorbed. Sound waves once absorbed in the shape-retaining felt layer are confined between the apertured resin layer and the non-air-permeable resin sheet layer and are reflected diffusely in the interior so that the energy of the sound waves is absorbed in the shape-retaining felt layer with high efficiency. Consequently, excellent sound absorption is obtained.

In the case of an ultra-lightweight apertured resin layer, an advantage is provided in that, in particular, the sound absorption for sound waves having frequencies equal to or more than 1000 Hz is improved.

(Sound Insulation)

Sound insulation is generated based on a hollow double-walled structure constituted of a panel of the automobile and a non-air-permeable resin sheet layer facing the panel while being spaced therefrom by a padding material therebetween. Sound insulating performance that is much greater than sound insulating performance based on mass law can be secured over the practical frequency domain by means of the hollow double-walled structure.

(Formability, Shape Retention)

In a structure in which a shape-retaining felt layer is sandwiched between two resin layers (an apertured resin layer and a non-air-permeable resin sheet layer), the two resin layers are heat formed and also the shape-retaining felt layer sandwiched between the two resin layers is heat formed since it includes low melting point fiber. Consequently, excellent formability is obtained by combination of these layers, and rigidity for retaining the formed shape after being formed can be improved.

BEST MODE FOR CARRYING OUT THE INVENTION

Figure 1:
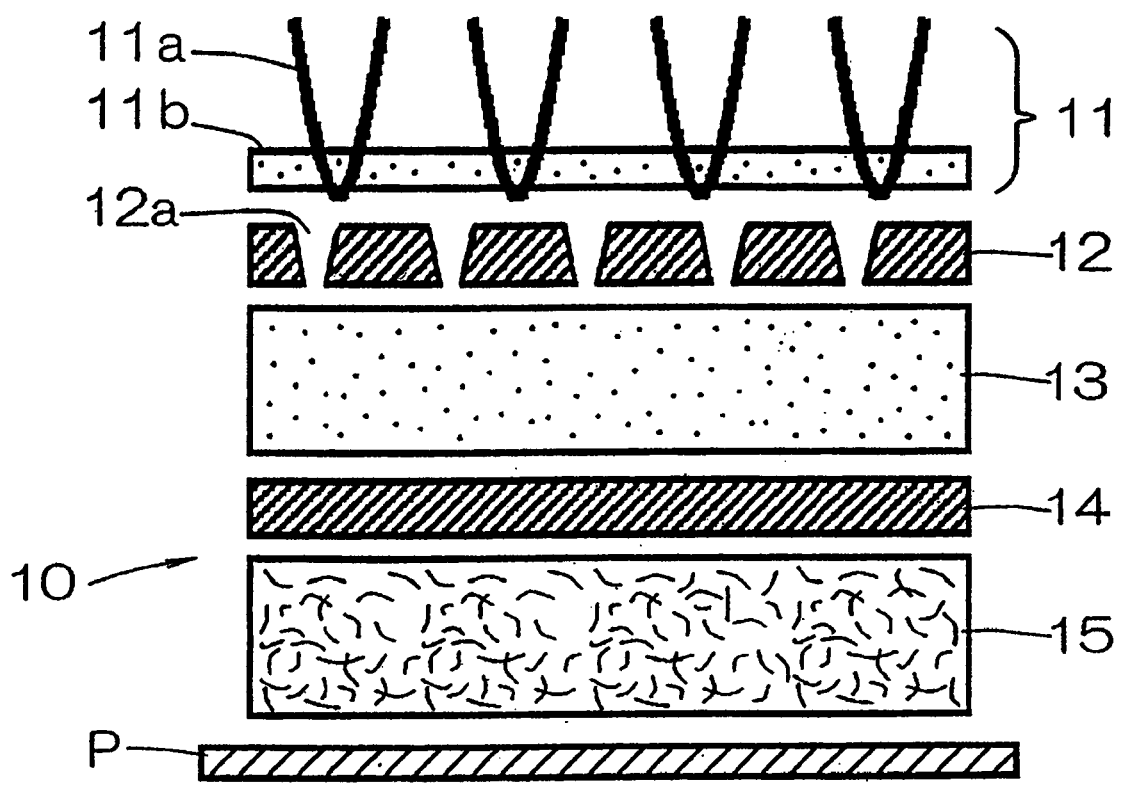
FIG. 1 A sectional view schematically showing a formable laid interior decoration material for an automobile of an embodiment of the present invention FIG. 2 A graph showing the measurement results, for production examples and a comparative example, of the sound absorption of formable laid interior decoration materials for an automobile FIG. 3 A graph showing the measurement results, for production examples and a comparative example, of the sound insulation of formable laid interior decoration materials for an automobile FIG. 4 A graph showing the measurement results of the sound absorption of a formable laid interior decoration material for an automobile of the present invention in a case where the air-permeability rate of the laminated body of the air-permeable design layer, the shape-retaining felt layer, and the non-air-permeable resin sheet layer is varied

FIG. 1 is a sectional view schematically showing a formable laid interior decoration material of an embodiment of the present invention.

Formable laid interior decoration material (10) of the present invention is formed by laminating air-permeable design layer (11)/apertured resin layer (12)/shape-retaining felt layer (13)/non-air-permeable resin sheet layer (14)/padding material (15), in this order from the side facing the passenger chamber of the automobile toward panel (P) at the location where the material is laid.

Air-permeable design layer (11) is a layer forming the design surface of formable laid interior decoration material (10). As air-permeable design layer (11), a tufted carpet (of various types such as loop pile type, cut pile type) can preferably be used wherein pile (11a) is formed in a piloerection state on air-permeable base fabric (11b) as shown in FIG. 1. A needle-punched carpet (of various types such as plain type, velour type, Dilour type), wherein a fiber web is punched by needles to harden, may also be used as air-permeable design layer (11). Air-permeable design layer (11) has a predetermined abrasion resistance and yarn-unraveling resistance, and preferably has a high air-permeability rate so that it can guide sound waves to apertures (12a) of apertured resin layer (12).

The air-permeability rate of air-permeable design layer (11) is preferably 10 cc/cm$^2$/second (JIS L-1096) or more. Thereby reflection of sound waves by air-permeable design layer (11) can be suppressed to sufficiently guide sound waves to apertures (12a) of apertured resin layer (12).

Apertured resin layer (12) is a thin low melting point thermoplastic resin sheet (such as polyethylene resin, modified polyester resin) having a thickness of 0.01 to 4.0 mm in general, especially preferably 0.1 to 1.0 mm, in which a large number of apertures (12a) are formed at a predetermined distribution density.

Apertured resin layer (12) functions to bond air-permeable design layer (11) and shape-retaining felt layer (13), and functions to guide sound waves from the design layer side to shape-retaining felt layer (13). That is, sound waves reaching apertured resin layer (12) pass through apertures (12a) to reach shape-retaining felt layer (13). In addition, apertured resin layer (12) is caused to vibrate by sound waves since it is thin, and the vibration also guides energy of the sound waves to shape-retaining felt layer (13). Further, apertured resin layer (12) also functions to confine the sound waves which are guided to shape-retaining felt layer (13) side, between apertured resin layer (12) and non-air-permeable resin sheet layer (14). Consequently, the confined sound waves are diffusely reflected in shape-retaining felt layer (14) to be attenuated.

In addition, apertured resin layer (12) made of thermoplastic resin also functions to impart formability to formable laid interior decoration material (10) by means of its heat plasticizing properties.

Apertures (12a) of apertured resin layer (12) are through-apertures. The profile of apertures (12a) is preferably one that is close to a circle. The inner diameter of apertures (12a) may either be constant in the thickness direction of apertured resin layer (12) or may gradually change. The number of apertures (12a) formed in apertured resin layer (12) is suitably 1 to 90/cm$^2$ in general, especially 6 to 25/cm$^2$. The diameter of apertures (12a) is suitably 0.1 to 8.5 mm, especially 0.1 to 3.0 mm. The aperture rate is suitably in the range of 0.05 to 70%, especially 0.05 to 50%, wherein the aperture rate is defined as the ratio of the area occupied by apertures (12a) to the area of apertured resin layer (12).

The above-mentioned aperture forming condition (aperture rate) of apertured resin layer (12) must be determined so as to secure sufficient paths for introducing sound waves from air-permeable design layer (11) to shape-retaining felt layer (13). However, if the aperture rate or the diameter of apertures (12a) is too large, large proportion of sound waves which are absorbed in the shape-retaining layer are reflected by the non-air-permeable resin sheet layer and then outwardly escape without being reflected again by apertured resin layer (12), thereby lowering the attenuation of sound waves by diffuse reflection in shape-retaining felt layer (13). Therefore, the aperture rate and the diameter of apertures (12a) in the above-mentioned range are preferable.

A conclusion of the inventors' study is that the sound absorbing performance can be improved while retaining the sound insulating performance by making the air-permeability rate of the laminated body of air-permeable design layer (11)/apertured resin layer (12)/shape-retaining felt layer (13), 1 to 30 cc/cm$^2$/second, especially preferably 5 to 15 cc/cm$^2$/second.

When the air-permeability rates of air-permeable design layer (11) and shape-retaining felt layer (13) are relatively low, the aperture rate can be increased within the above-mentioned range by changing the inner diameter of apertures (12a) and the number of the apertures. When the air-permeability rates of air-permeable design layer (11) and shape-retaining felt layer (13) are high, the aperture rate can be decreased within the above-mentioned range by changing the inner diameter of apertures (12a) and the number of the apertures. The air-permeability rate of the above-mentioned laminated body can be adjusted within the preferable range of 1 to 30 cc/cm$^2$/second (especially 5 to 15 cc/cm$^2$/second) by adjusting the aperture rate in this way.

Apertures (12a) may also be formed at a high arrangement density in a particular region of formable laid interior decoration material (10).

The weight per unit area of apertured resin layer (12) is suitably 50 to 400 g/m$^2$ and especially suitably 100 to 300 g/m$^2$. The weight per unit area of apertured resin layer (12) must be at least 50 g/m$^2$ in order to form a layer structure. On the other hand, when the weight per unit area of apertured resin layer (12) is 400 g/m$^2$ or less, increase of the entire weight of formable laid interior decoration material (10) can be suppressed, and apertured resin layer (12) can perform the above-described function by well vibration due to sound waves.

The final forming aspect of aperture (12a) is designed and calculated for each type of vehicle so as to obtain optimum sound absorption and sound insulation under condition where each formable laid interior decoration material (10) is formed and is actually laid in the passenger chamber of automobiles, and its effects are verified in real vehicle test.

The most suitable processing method for forming apertures (12a) of apertured resin layer (12) is the heat perforation method. Here, the heat perforation method is a method in which a thermoplastic resin sheet that forms apertured resin layer (12) is pierced by a large number of hot needles which are heated to a temperature sufficient for melting the thermoplastic resin to form apertures (12a). In this case, the thermoplastic resin at the locations pierced by the hot needles is melted and thereby apertures (12a) are formed.

The heat perforation method has an advantage in that formed apertures (12a) are not liable to be closed in the subsequent processes as compared with non-heating needle piercing method. In addition, the heat perforating method has advantages in that punched chips are not produced and that burrs are not formed around apertures (12a), as compared with punching process or the like. Further, apertures of various aspects are readily formed using the same equipment by controlling the temperature of the hot needles, the time of needle piercing, and the depth of needle piercing.

In the case where apertured resin layer (12) is pierced by hot needles and the thermoplastic resin at the locations pierced by the hot needles is melted to form apertures (12a), the process is suitably performed by piercing with the hot needles from the resin sheet side such that the tips of the needles penetrate through the resin sheet to reach shape-retaining felt layer (13) or air-permeable design layer (11) under condition in which the resin sheet to form apertured resin layer (12) and shape-retaining felt layer (13) are laminated (alternatively, the resin sheet to form apertured resin layer (12) and air-permeable design layer (11) are laminated). This case has an advantage in that a large number of apertures (12a) are reliably formed in the resin sheet. In addition, when the method is performed by laminating the resin sheet and shape-retaining felt layer (13), fibers of shape-retaining felt layer (13) are slightly melted by the heat of the tips of the hot needles and a large number of minute voids that communicate with apertures (12a) can be formed. These minute voids help to spread sound waves coming from apertures (12a) in shape-retaining felt layer (13) and have the effect of improving the sound absorbing effect in shape-retaining felt layer (13).

Methods for forming apertured resin layer (12) include the following methods besides the above-mentioned heat perforation method.

(Powder Method)

All-melting-type low melting point resin powder, preferably polyethylene powder is uniformly dispersed on the back surface of air-permeable design layer (11) or on the surface of shape-retaining felt layer (13) to arrange the powder between air-permeable design layer (11) and shape-retaining felt layer (13). The average particle diameter of the powder is preferably 0.1 to 1.0 mm, and the dispersed amount is preferably 50 to 400 g/m$^2$. Thereafter, when the low melting point resin powder is completely melted by heat at the time of forming formable laid interior decoration material (10), voids are formed in the melted resin, thereby forming apertures (12a). The aperture rate and the air-permeability rate can be controlled by adjusting the density of dispersion of powder.

(Melt Fiber Method)

In all-melting-type low melting point fiber, preferably polyethylene fiber, fiber having a melting point higher than the low melting point fiber, for example regular polyester fiber, is blended in a low ratio less than 10% to form a fiber web. The weight per unit area of the fiber web is preferably 50 to 400 g/m$^2$. This fiber web is arranged between air-permeable design layer (11) and shape-retaining felt layer (13), and the low melting point fiber is completely melted by heat at the time of forming formable laid interior decoration material (10). Thereby voids are formed in the melted resin and apertures (12a) can be formed. At this time, because high melting point fiber is blended in the low melting point fiber, the unmelted high melting point fiber restrains the melted resin from making large lumps to achieve the effect of appropriately dispersing the melted resin.

(Normal Temperature Needling Method)

A resin sheet having a melting point of 200° C. or less, such as polypropylene, polyethylene, low melting point polyester, low melting point polyamide, is superposed on air-permeable design layer (11) or on shape-retaining felt layer (13). The resin sheet preferably has a thickness of 0.5 to 0.3 mm and a weight per unit area of 50 g to 300 g/m². Thereafter, by punching the resin sheet with needles used for forming a needle punched nonwoven fabric, predetermine apertures are formed in the resin sheet, and as well, the resin sheet is laminated on the back surface of air-permeable design layer (11) or on the surface of shape-retaining felt layer (13). The resin sheet arranged between air-permeable design layer (11) and shape-retaining felt layer (13) is slightly melted by heat at the time of forming formable laid interior decoration material (10) to thereby laminate these three layers. In this case, the diameter of aperture (12a) can be adjusted by means of the diameter of the needle used for needling the resin sheet. The aperture rate and the air-permeability rate can be controlled by adjusting the needling density in addition to the diameter of aperture (12a).

Shape-retaining felt layer (13) is an air-permeable fiber layer sandwiched between apertured resin layer (12) and non-air-permeable resin sheet layer (14). For shape-retaining felt layer (13), a nonwoven body of low density and high volume formed by entangling fibers by needle punch processing or the like is suitable.

For the constituent fibers of shape-retaining felt layer (13), suitably polypropylene fiber, regular polyester fiber, low melting point modified polyester fiber and the like are blended and used. Each constituent fiber suitably has a fiber diameter of 3 to 20 decitex and a fiber length of 3 to 20 mm. The weight per unit area of shape-retaining felt layer (13) is suitably 100 to 1000 g/m².

Shape-retaining felt layer (13) is located between apertured resin layer (12) and non-air-permeable resin sheet layer (14), being applied to each of both layers. Thus shape-retaining felt layer (13) functions to secure a predetermined space of 1.5 mm or more and air-permeability (preferably 10 cc/cm²/second or more) between apertured resin layer (12) and non-air-permeable resin sheet layer (14).

It is preferable that the thickness of shape-retaining felt layer (13) is 1.5 mm or more and that the density thereof is less than 0.2 g/cm³, since it facilitates diffuse reflection of sound waves in the interior. In addition, the air-permeability rate of shape-retaining felt layer (13) is suitably in the range of 10 to 200 cc/cm²/second.

Formability and retention of formed shapes of formable laid interior decoration material (10) can be improved by blending low melting point fiber having a melting point of less than 160° C. into shape-retaining felt layer (13) by 10 to 50% by weight. Blending of not more than 50% by weight of low melting point fiber suppresses too strong entanglement between fibers at the time of forming which would lower the formability, thereby making it possible for the material to be favorably formed into complex shapes and deep drawn shapes. Blending of not less than 10% by weight of low melting point fiber secures sufficient bonding between fibers, thereby providing sufficient rigidity to enable shapes that have been formed to retain their form.

Non-air-permeable resin sheet layer (14) can be formed by extruding low melting point thermoplastic resin (such as low density polyethylene resin and ethylene vinyl acetate resin) by a sheet extruder or the like. The weight per unit area of non-air-permeable resin sheet layer (14) is 50 to 3000 g/m², especially preferably 200 to 1500 g/m².

Non-air-permeable resin sheet layer (14), being substantially non-air permeable and arranged on the back surface of shape-retaining felt layer (13) to form a hollow double-walled structure with panel (P), generates a sound insulation effect especially against sound waves intruding from the direction of panel (P). A large weight per unit area of non-air-permeable resin sheet layer (14) is preferable since it tends to improve the sound insulation effect. Therefore, it is preferable to secure weight per unit area of non-air-permeable resin sheet layer (14) in a range permissible for an automobile without making the weight of formable laid interior decoration material (10) too heavy.

In addition, non-air-permeable resin sheet layer (14) has a function of bonding shape-retaining felt layer (13) and padding material (15). Further, it can provide formable laid interior decoration material (10) with formability and retention of formed shapes by means of the heat plasticizing properties of thermoplastic resin.

By sandwiching shape-retaining felt layer (13) between the two resin layers of non-air-permeable resin sheet layer (14) and apertured resin layer (12), rigidity, that is sufficient to enable shapes that have been formed to retain their form, can be secured even when each weight per unit area of non-air-permeable resin sheet layer (14) and shape-retaining felt layer (13) is light. This can reduce reinforcing materials such as hard sheets which are often used for providing rigidity in this kind of laid interior decoration materials, thereby enabling reduction in cost and weight.

Padding material (15) is made of a foam product of PS, PP, or the like or urethane foam and has cushioning properties. Such padding material (15) can be formed by solidifying synthetic fiber felt, natural fiber felt, recycled fiber felt, sheet scraps or the like by means of resin or melt fiber. The thickness of padding material (15) is on the order of 5 to 100 mm. Padding material (15) functions to secure space between formable laid interior decoration material (10) and panel (P) for forming a hollow double-walled sound insulation structure, and also functions to absorb sound waves between panel (P) and non-air-permeable resin sheet layer (14).

The present invention will be described more specifically by production examples and a comparative example below.

PRODUCTION EXAMPLE 1

Air-permeable design layer: for an air-permeable design layer of Production Example 1, a base fabric made of polyester fiber nonwoven fabric having a weight per unit area of 110 g/m² which is tufted with 1170 decitex nylon BCF cut pile as pile yarn with gauge 1/10, stitch 46/10 cm, pile height 6.5 mm, pile weight 350 g/m² was used. Latex was applied to the back surface of the base fabric in weight per unit area of 50 g/m². The air-permeability rate of this air-permeable design layer was 63 cc/cm²/second.

Apertured resin layer: for an apertured resin layer of Production Example 1, a resin sheet formed to have a weight per unit area of 250 g/m² (0.25 mm thick) by extruding low density polyethylene resin from a sheet extruder was used. Apertures were formed in this resin sheet based on the following condition.

Aperture forming condition: the sheet was pierced by a large number of hot needles (the angle of needle tip 35°) heated to the temperature of 200° C. to the depth of 0.5 mm to form circular through-apertures having a diameter of 1.2 mm. The interval of the apertures was 4.0 to 5.6 mm, the arrangement of the apertures was a zigzag arrangement substantially uniform as a whole, and the aperture rate was 12%.

Shape-retaining felt layer: for a shape-retaining felt layer of Production Example 1, a layer having regular polyester fiber (6.6 decitex, fiber length 64 mm) and low melting point modified polyester fiber (4.4 decitex, fiber length 51 mm) which were blended in a ratio of 7:3 and which were entangled by needling was used. The thickness of the shape-retaining felt layer was 3.0 mm, and the weight per unit area was 300 g/m$^2$. The air-permeability rate of this shape-retaining felt layer was 96 cc/cm$^2$/second.

The air-permeability rate of the laminated body of air-permeable design layer/apertured resin layer/shape-retaining felt layer, was 10 cc/cm$^2$/second.

Non-air-permeable resin sheet layer: for a non-air-permeable resin sheet layer of Production Example 1, a resin sheet which has a weight per unit area of 200 g/m$^2$ and which is formed by extruding a common low density polyethylene resin (the density 0.91 g/cm$^3$) in the form of a sheet was used. This resin sheet was applied to the back surface of the shape-retaining felt layer while it was in the melted state.

Padding material: for a padding material of Production Example 1, a synthetic fiber felt having a thickness of 20 mm and a density of 0.06 g/cm$^3$ was used and was applied to the back surface of the non-air-permeable resin sheet layer.

PRODUCTION EXAMPLE 2

Air-permeable design layer: for an air-permeable design layer of Production Example 2, the same layer as that of Production Example 1 was used.

Apertured resin layer: for an apertured resin layer of Production Example 2, the same layer as that of Production Example 1 was used.

Shape-retaining felt layer: for a shape-retaining felt layer of Production Example 2, a layer which has the same fiber blend and the same thickness as that of Production Example 1 and which has a weight per unit area of 500 g/m$^2$ was used. The air-permeability rate of this shape-retaining felt layer was 90 cc/cm$^2$/second, which was not much different from that of the shape-retaining felt layer of Production Example 1.

The air-permeability rate of the laminated body of air-permeable design layer/apertured resin layer/shape-retaining felt layer, was 10 cc/cm$^2$/second, which was the same as that of Production Example 1.

Non-air-permeable resin sheet layer: for a non-air-permeable resin sheet layer of Production Example 2, the same layer as that of Production Example 1 was used.

Padding material: for a padding material of Production Example 2, the same material as that of Production Example 1 was used.

PRODUCTION EXAMPLE 3

Air-permeable design layer: the same air-permeable design layer as that in Production Example 1 was used in Production Example 3.

Apertured resin layer: the same apertured resin layer as that in Production Example 1 was used in Production Example 3.

Shape-retaining felt layer: the shape-retaining felt layer in Production Example 3 had the same fiber blending as that in Production Example 1 and had a unit area weight of 500 g/m$_2$ and a thickness of 5 mm. The shape-retaining felt layer had an air permeability of 97 cc/cm$^2$/second, which was not so different from that of the shape-retaining felt layer in Production Example 1.

A laminated body of the air-permeable design layer/the apertured resin layer/the shape-retaining felt layer, had an air permeability of 10 cc/cm$^2$/second, which was the same as that in Production Example 1.

Non-air-permeable resin sheet layer: the same non-air-permeable resin sheet layer as that in Production Example 1 was used in Production Example 3.

Padding material: the same padding material as that in Production Example 1 was used in Production Example 3.

Production Example 4

Air-permeable design layer: the same air-permeable design layer as that in Production Example 1 was used in Production Example 4.

Apertured resin layer: the same apertured resin layer as that in Production Example 1 was used in Production Example 4.

Shape-retaining felt layer: the same shape-retaining felt layer as that in Production Example 1 was used in Production Example 4. The shape-retaining felt layer in Production Example 4 had an air permeability of 96 cc/cm$^2$/second, which was the same as that in Production Example 1.

A laminated body of the air-permeable design layer/the apertured resin layer/the shape-retaining felt layer, had an air permeability of 10 cc/cm$^2$/second, which was the same as that in Production Example 1.

Non-air-permeable resin sheet layer: the non-air-permeable resin sheet layer in Production Example 4 had a weight per unit area of 1,000 g/m$^2$.

Padding material: the same padding material as that in Production Example 1 was used in Production Example 4.

Comparative Example

Air-permeable design layer: the same air-permeable design layer as that in Production Example 1 was used in the Comparative Example.

Apertured resin layer: the same apertured resin layer as that in Production Example 1 was used in the Comparative Example.

Shape-retaining felt layer: the same shape-retaining felt layer as that in Production Example 1 was used in the Comparative Example, The shape-retaining felt layer in the Comparative Example had an air permeability of 96 cc/cm$^2$/second, which was the same as that in Production Example 1.

A laminated body of the air-permeable design layer/the apertured resin layer/the shape-retaining felt layer, had an air permeability of 10 cc/cm$^2$/second, which was the same as that in Production Example 1.

Non-air-permeable resin sheet layer: a non-air-permeable resin sheet layer was not provided in the Comparative Example.

Padding material: the same padding material as that in Production Example 1 was used in the Comparative Example. The padding material and the shape-retaining felt layer were laminated by scattering a very small amount of polyethylene resin power which can avoid affecting physical properties such as air permeability, over a surface of the padding material and by melting the polyethylene resin powder to make the padding material adhere to the shape-retaining felt layer.
(Evaluation Method)

For the laid material samples in Production Examples 1 to 4 and in the Comparative Example, the capabilities of sound absorption and insulation were comparatively evaluated. The sound absorbing capability was evaluated on the basis of reverberation room method sound absorbing coefficient (JIS A-1409). The sound insulating capability was evaluated by measuring acoustic transmission loss (JIS A-1416).

Figure 2:
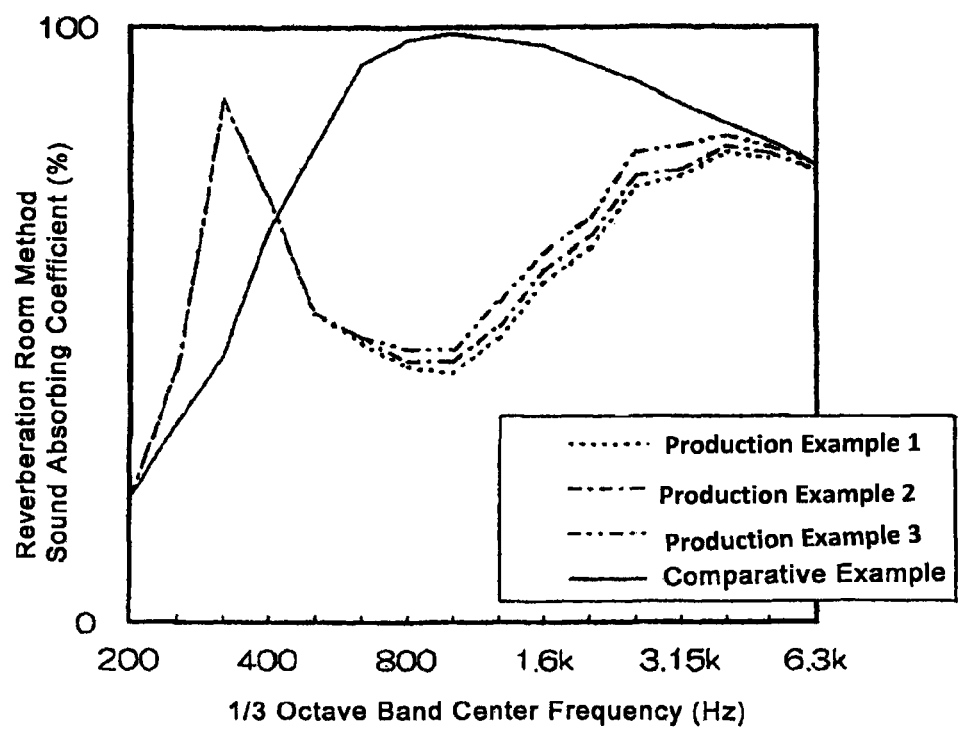
Figure 3:
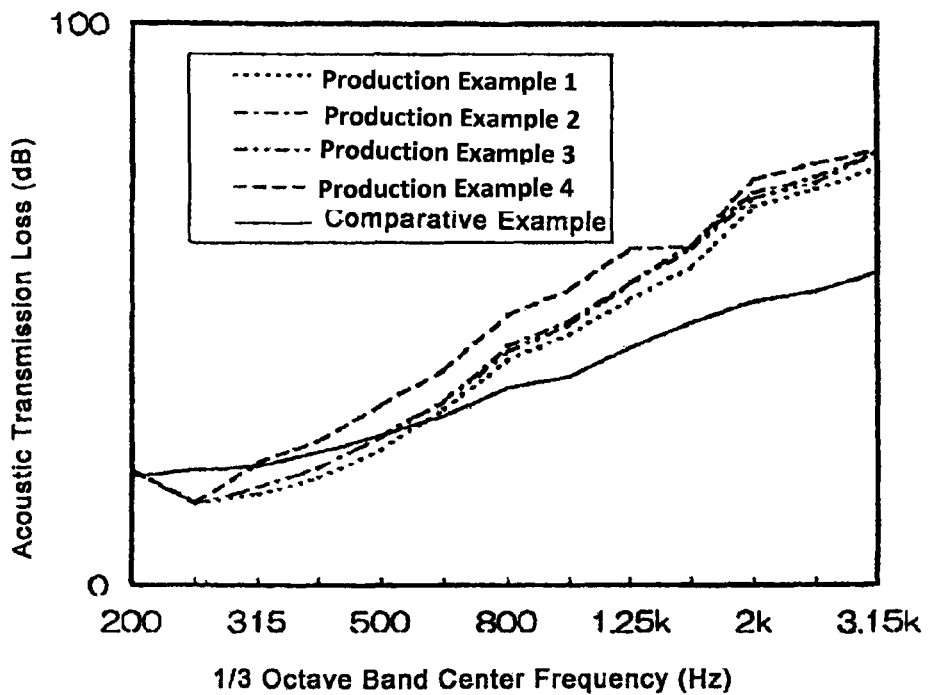

The results are shown in FIG. 2 (reverberation room method sound absorbing coefficient) and in FIG. 3 (acoustic transmission loss).

(Results)

FIG. 2 indicates the following in connection with the sound absorbing capability.

For the sound absorbing property, a comparison between Production Examples 1 to 3 showed that unlike Production Example 1, Production Examples 2 and 3 had a tendency to exhibit a high sound absorbing coefficient in a high frequency region. The difference between the configurations in Production Examples 1 to 3 was in the shape-retaining felt layer. Production Examples 2 and 3, which had the greater weight per unit area of shape-retaining felt layer in comparison with Production Example 1, exhibited a better sound absorbing capability than that of Production Example 1. Furthermore, a comparison between Production Examples 2 and 3 showed that Production Example 3, which had the same weight per unit areas as that of Production Example 2 and which had a thicker shape retaining felt layer than Production Example 2, exhibited a better sound absorbing capability.

These results indicate that in the configuration of the present invention, it can be seen that the configuration of the shape-retaining felt layer has a profound effect on the sound absorbing performance. The frequency corresponding to the peak of the sound absorbing coefficient in Comparative Example, which does not have non-air-permeable resin sheet layer, is different from that in the Production Examples. The aspect of sound absorption in the Comparative Example is thus different from that in the present invention.

FIG. 3 indicates the following in connection with the sound insulating capability.

For the sound insulating property, a comparison among Production Examples 1 to 4 showed that Production Examples 1 to 3 had only a small difference in sound insulating property and that Production Example 4 exhibited a better sound insulating capability than the other Production Examples. The difference between the configuration of Production Example 4 and the configurations of Production Examples 1 to 3 is in the non-air permeable resin sheet layer. Production Example 4, which had the greater weight per unit area of non-air-permeable resin sheet layer than that of Production Examples 1 to 3, exhibited a better sound insulating capability. Thus, it can be seen that in the configuration of the present invention, the non-air-permeable resin sheet layer has a profound effect on the sound insulating capability.

Comparative Example is significantly inferior to the Production Examples in sound insulating capability owing to the lack of a non-air-permeable resin sheet layer.

(Discussions)

Figure 4:
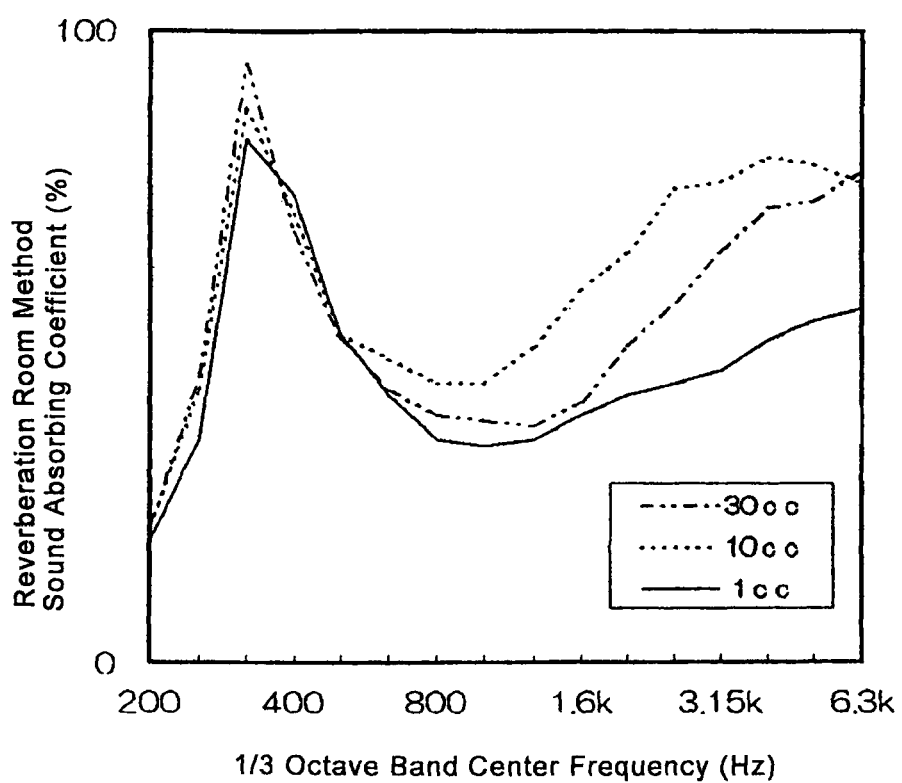

FIG. 4 shows an example in which the sound absorbing capability was evaluated by varying the air permeability of the laminated body of the air-permeable design layer/apertured resin layer/shape-retaining felt layer, within the range from 1 to 30 cc/cm$^2$/second. The air permeability of the laminated body was 10 cc/cm$^2$/second in Production Example 1. The air permeability of these laminates was varied by varying the aperture diameter of the apertured resin layer among 0.5 mm, 1.2 mm, and 2.0 mm.

The best sound absorbing capability was exhibited by a laid material in which the laminated body of the air-permeable design layer/apertured resin layer/shape-retaining felt layer, had an air permeability of 10 cc/cm$^2$/second. The next best sound absorbing capability was exhibited by a laid material in which the laminated body had an air permeability of 30 cc/cm$^2$/second. A laid material in which the laminated body had an air permeability of 1 cc/cm$^2$/second exhibited a low sound absorbing coefficient.

The results indicate that for air permeability of the laminated body of the air-permeable design layer/the apertured resin layer/the shape-retaining felt layer, the most preferable value is about 10 cc/cm$^2$/second. This indicates that the sound absorbing capability is degraded at an extremely high air permeability and an extremely low air permeability.

In view of the above-described results, the formable laid interior decoration material for an automobile according to the present invention exhibits both excellent sound absorbing and insulating performance, and is particularly excellent in sound insulating capability. Therefore, the formable laid interior decoration material for an automobile according to the present invention is suitable for application to vehicles such as diesel engine cars in which there is a tendency for engine noise to enter through a floor panel.

In contrast, interior decoration material formed by laminating only air-permeable materials as in the case of the Comparative Example may be applied to vehicles having a demanding requirement for sound absorbing capability but is difficult to apply to vehicles having a demanding requirement for sound insulating capability.

The invention claimed is:

1. A formable laid interior decoration material for use in an automobile, the formable laid interior decoration material comprising:
   a padding material;
   a non-air-permeable resin sheet layer provided on the padding material;
   a shape-retaining felt layer comprising melted fiber, the shape-retaining felt layer being provided on the non-air-permeable resin sheet layer;
   an apertured resin layer having a plurality of apertures penetrating in a thickness direction, the apertured resin layer being provided on the shape-retaining felt layer;
   an air-permeable design layer provided on the apertured resin layer;
   wherein the plurality of apertures are configured to secure paths for introducing sound waves from the air-permeable design layer to the shape-retaining felt layer;
   wherein the shape-retaining felt layer has a weight per unit area of 100 to 1000 g/m$^2$ and a thickness of 1.5 mm or more;
   wherein the apertured resin layer has a weight per unit area of 50 to 400 g/m$^2$ and a thickness of 0.01 to 4.0 mm;
   wherein the apertures have diameters of 0.1 to 8.5 mm and an aperture rate of 0.05 to 70%;
   wherein the non-air-permeable resin sheet layer is formed as a substantially non-air permeable layer by extruding thermoplastic resin in a form of a sheet having a weight per unit area of 50 to 3000 g/m$^2$, in a melted state, and by applying the resin to a back surface of the shape-retaining felt layer;
   wherein a laminate of the air-permeable design layer, the apertured resin layer, the shape-retaining felt layer including melted fiber, the non-air-permeable resin sheet layer, and the padding material is heat formed in a shape that conforms to a shape at a location where the material is laid in the automobile; and
   wherein the non-air-permeable resin layer forms a hollow structure together with a panel of the automobile, while being spaced from the panel by the padding material.

2. The formable laid interior decoration material for an automobile according to claim 1, wherein an air-permeability rate of a laminated body of the air-permeable design layer, the apertured resin layer, and the shape-retaining felt layer is 1 to 30 cc/cm2/second.

3. The formable laid interior decoration material for an automobile according to claim 1, wherein the shape-retaining felt layer includes as the melted fiber a low melting point fiber having a melting point of less than 160° C. in a ratio of 10 to 50% by weight, and has an air-permeability rate of 10 to 200 cc/cm2/second.

* * * * *